United States Patent
Ren et al.

(10) Patent No.: US 11,619,578 B2
(45) Date of Patent: Apr. 4, 2023

(54) METHOD AND APPARATUS FOR DETERMINING OPTICAL CONSTANT OF MATERIAL, AND METHOD AND APPARATUS FOR EXTENDING MATERIAL DATABASE

(71) Applicant: NANKAI UNIVERSITY, Tianjin (CN)

(72) Inventors: Meng-Xin Ren, Tianjin (CN); Jin-Chao Liu, Tianjin (CN); Di Zhang, Tianjin (CN); Jing-Jun Xu, Tianjin (CN)

(73) Assignee: NANKAI UNIVERSITY, Tianjin (CN)

( * ) Notice: Subject to any disclaimer, the term of this patent is extended or adjusted under 35 U.S.C. 154(b) by 283 days.

(21) Appl. No.: 16/897,255

(22) Filed: Jun. 9, 2020

(65) Prior Publication Data

US 2020/0393363 A1    Dec. 17, 2020

(30) Foreign Application Priority Data

Jun. 11, 2019    (CN) .......................... 201910500995.0

(51) Int. Cl.
*G01N 21/21*    (2006.01)
*G01N 21/84*    (2006.01)
(Continued)

(52) U.S. Cl.
CPC ....... *G01N 21/211* (2013.01); *G01N 21/8422* (2013.01); *G06K 9/6227* (2013.01);
(Continued)

(58) Field of Classification Search
CPC ........... G01N 2021/213; G01N 21/211; G01N 2201/1296; G06N 3/08
See application file for complete search history.

(56) References Cited

U.S. PATENT DOCUMENTS

2005/0236589 A1* 10/2005 Brunfeld ............ G01N 21/9501
250/559.11
2012/0086940 A1* 4/2012 Shih ..................... G01N 21/956
702/155

(Continued)

FOREIGN PATENT DOCUMENTS

CN    108875913    11/2018

OTHER PUBLICATIONS

Gwang-Hoon Park, Yoh-Han Pao, B. Igelnik, K. G. Eyink and S. R. LeClair, "Neural-net computing for interpretation of semiconductor film optical ellipsometry parameters," in IEEE Transactions on Neural Networks, vol. 7, No. 4, pp. 816-829, Jul. 1996, doi: 10.1109/72.508926 (Year: 1996).*

(Continued)

*Primary Examiner* — Violeta A Prieto

(57) ABSTRACT

A method for determining an optical constant of a material includes: acquiring ellipsometric parameters; obtaining a optical constant of the material corresponding to the ellipsometric parameters by a machine learning model; the machine learning model including a mapping relationship between the ellipsometric parameters and the material optical constant of the material corresponding to the ellipsometric parameters. The method uses the machine learning model to implement an automatic fitting of ellipsometric parameters. In the method, the optical constant of the material is calculated by a machine learning model, which no longer depends on the experiences of the experimenters, thereby reducing requirements for the operator, accelerating the fitting of the data curve when calculating the optical constants of the material and improving the operation efficiency.

8 Claims, 11 Drawing Sheets

(51) Int. Cl.
  *G06N 3/08* (2006.01)
  *G06K 9/62* (2022.01)
(52) U.S. Cl.
  CPC ......... *G06K 9/6261* (2013.01); *G06K 9/6262* (2013.01); *G06N 3/08* (2013.01); *G01N 2021/213* (2013.01); *G01N 2201/1296* (2013.01)

(56) References Cited

U.S. PATENT DOCUMENTS

| | | | |
|---|---|---|---|
| 2018/0196358 A1* | 7/2018 | Lee | G03F 7/70091 |
| 2018/0232630 A1* | 8/2018 | Chen | G03F 7/70625 |
| 2020/0386539 A1* | 12/2020 | Hsu | H01L 22/12 |

OTHER PUBLICATIONS

OA1 for Japanese Application No. 2020-513644 dated Oct. 26, 2021 (7 pages).
Park G et al: "Neural-net based optical ellipsometry for monitoring growth of semiconductor films", Annual Review in Automatic Programming, vol. 19, Jan. 1, 1994, pp. 123-128.

\* cited by examiner

METHOD AND APPARATUS FOR DETERMINING OPTICAL CONSTANT OF MATERIAL, AND METHOD AND APPARATUS FOR EXTENDING MATERIAL DATABASE

CROSS REFERENCE TO RELATED APPLICATIONS

This application claims priority to Chinese Patent Application No. 201910500995.0, entitled "Method and Apparatus for Determining Optical Constant of Material, and Method and Apparatus for Extending Material Database", filed on Jun. 11, 2019, the content of which is expressly incorporated by reference in its entirety.

TECHNICAL FIELD

The present disclosure relates to the field of material science and technology, and particularly to a method and an apparatus for determining an optical constant of a material, and a method and an apparatus for extending a material database.

BACKGROUND

An ellipsometer is an instrument that utilizes a polarization dependence of reflection characteristics of light waves on a surface of a material to measure an optical constant (such as a refractive index, a dielectric constant and so on) and a thickness of a thin film. The light with different polarizations reflected by the surface of the material may have different reflectances, which are related to the optical constants and the thickness of the thin film. By measuring the reflectance difference characteristic curve of incident lights with different polarization states and different wavelengths, and performing a regression fitting to the curves, the optical constant (such as the refractive index, the dielectric constant, etc.) and the thickness of the thin film can be obtained. Fast and accurate regression fitting of the curve is an important part of the ellipsometer, and is also a crucial step for obtaining optical constant information of the thin film.

In the conventional solution, the experimenters rely heavily on their own experiences and need to constantly try to adjust various fitting parameters to implement the fitting to obtain the optical constants or thin-film thickness of the material. This process requires the experimenters to have extremely rich experiences, and the regression fitting of the curve is slow and inefficient.

SUMMARY

A method for determining an optical constant of a material, includes:
  acquiring ellipsometric parameters of the material; and
  inputting the ellipsometric parameters into a machine learning model to obtain the optical constant of the material corresponding to the ellipsometric parameters; the machine learning model including a mapping relationship between the ellipsometric parameters and the optical constant of the material.

A method for extending a material database, includes:
  acquiring ellipsometric parameters of a material;
  inputting the ellipsometric parameters into a machine learning model to obtain an optical constant of the material corresponding to the ellipsometric parameters;
  looking up the optical constants of the material in the material database; and
  if the optical constant of the material is not included in the material database, adding the ellipsometric parameters of the material and the optical constant of the material corresponding to the ellipsometric parameters into the material database.

In an embodiment, the method further includes:
  determining whether the optical constant of the material corresponding to the ellipsometric parameters is included in the material database;
  if the optical constant of the material corresponding to the ellipsometric parameters is not included in the material database, adding a name of the material into the known material database.

In an embodiment, the method further includes:
  further updating the machine learning model if the optical constant of the material corresponding to the ellipsometric parameters is not in a preset optical constant range of the material.

An apparatus for determining an optical constant of a material, includes:
  an ellipsometric parameter acquisition module, configured to acquire ellipsometric parameters of the material; and
  a material optical constant acquisition module, configured to input the ellipsometric parameters into a machine learning model to obtain the optical constant of the material corresponding to the ellipsometric parameters; the machine learning model including a mapping relationship between the ellipsometric parameter and the optical constant of the material.

An apparatus for extending a material database, includes:
  an ellipsometric parameter acquisition module, configured to acquire ellipsometric parameters of the material;
  a material optical constant acquisition module, configured to input the ellipsometric parameters into a machine learning model to obtain an optical constant of the material corresponding to the ellipsometric parameters;
  a lookup module, configured to look up the optical constant of the material in a material database; and
  an extension module, configured to add the ellipsometric parameters of the material and the optical constants of the material corresponding to the ellipsometric parameters into the material database, if the optical constant of the material is not included in the material database.

A computer device including a processor and a memory storing a computer program executable on the processor, the steps in the method of any one of the above embodiments are implemented when the processor executes the computer program.

A computer-readable storage medium on which a computer program is stored, the steps in the method of any one of the above embodiments are implemented when the computer program is executed by a processor.

In an embodiment, an ellipsometer is provided, which includes:
  a light source configured to emit light;
  a light selection device configured to adjust wavelength and polarization of the light;
  a light polarization compensation device configured to modify polarization state of the light to form probe light, the probe light irradiating a surface of a material sample, the material including a substrate and a thin film on a surface of the substrate;
  a light polarization analysis device configured to acquire the probe light reflected or refracted by the material and obtain a measurement result; the measurement result comprising ellipsometric parameters Δ and Ψ of the material; and a material optical constant determination device, configured to determine an optical constant of the material by the method for determining an optical constant of a material according to any one of the above embodiments based on the measurement result, a wavelength of the probe light, an incident angle of the probe light, a real part of the refractive index of the thin film, and a imaginary part of the refractive index of the substrate; the optical constant including one or both of the real part and the imaginary part of the refractive index of the thin film.

The present disclosure provides a method and an apparatus for determining an optical constant of a material, and a method and an apparatus for extending a material database. The method for determining an optical constant of a material includes: acquiring ellipsometric parameters of the material; inputting the ellipsometric parameters into a machine learning model to obtain the optical constant of the material corresponding to the ellipsometric parameters; the machine learning model includes a mapping relationship between the ellipsometric parameters and the optical constant of the material. The method for determining an optical constant of a material uses the machine learning model to implement an automatic fitting of ellipsometric parameters. Since in the method for determining the optical constant of the material, the optical constant of the material is calculated by a machine learning model, which no longer depends on the experiences of the experimenters, thereby reducing the requirements for the operators, accelerating the fitting of the data curve when calculating the optical constant of the material and improving the operation efficiency.

DETAILED DESCRIPTION

In order to make the objectives, technical solution, and advantages of the present disclosure clearer, a method and an apparatus for determining an optical constant of a material, and a method and an apparatus for extending a material database detailed with reference to the accompanying drawings and embodiments. It should be noted that the specific embodiments described herein are merely used for explaining the present disclosure, and are not intended to limit the present disclosure.

Figure 1:
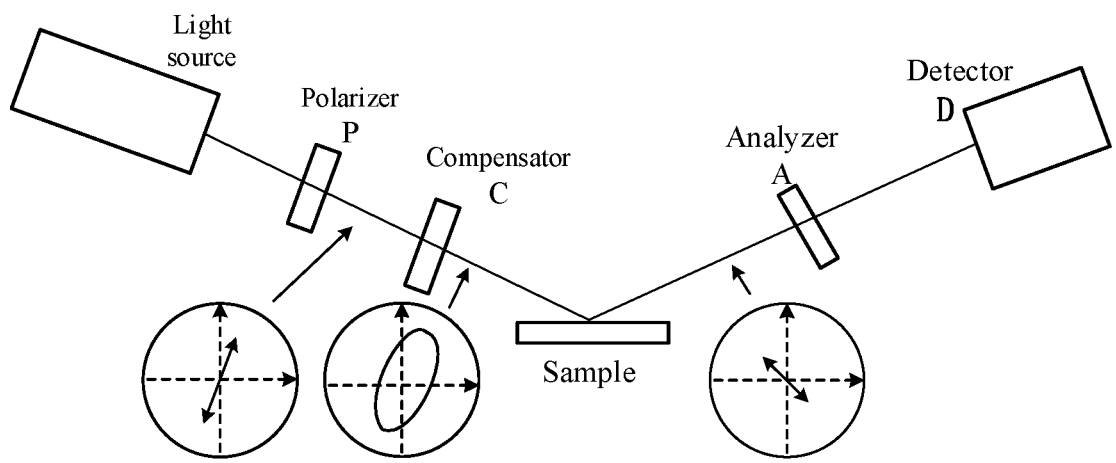
FIG. 1 is a schematic view showing a working principle of an ellipsometer according to an embodiment of the present disclosure.

An ellipsometer is an optical instrument for measuring an optical constant of a material meanwhile a thickness of a film. Due to the advantages such as high accuracy, usefulness for an ultra-thin film, no contact with the sample and no damage to the sample, the ellipsometer becomes an attractive instrument. Ellipsometry is high accurate, contactless, non-destructive. As shown in FIG. 1, an ellipsometer generally includes a light source, a polarizer P, a compensator C, an analyzer A, and a detector D (e.g., single-point or area array detector).

In use of the ellipsometer, light output from a continuous-spectrum white light source passes through a grating for a frequency selection to form monochromatic light. After the monochromatic light passes through the polarizer P and the compensator C, it is formed into elliptically polarized light and irradiates the sample. The differences in the reflectance $r^s$ of the s-polarization and the reflectance $r^P$ of the p-polarization of the sample change the polarization state of the reflected light. The intensity of the reflected light passed through the analyzer A is measured by the detector D.

Figure 2:
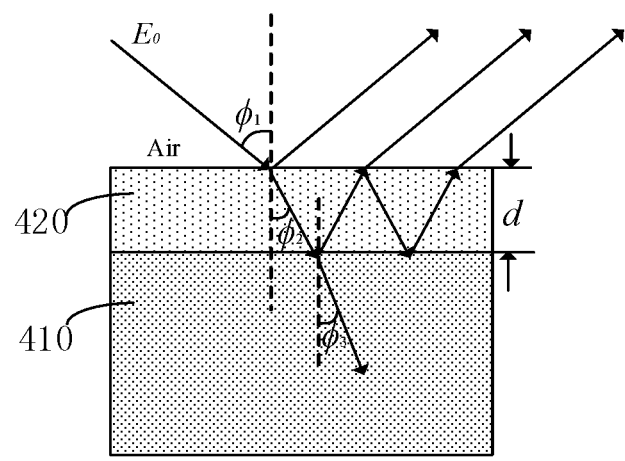
FIG. 2 shows a theoretical model for determining ellipsometric parameters Δ and Ψ according to an embodiment of the present disclosure.

FIG. 2 schematically shows directions of lights propagating in the sample of the ellisometry test. As exemplified in FIG. 2, the material sample includes a substrate and a thin film on the substrate. The light emitted from the light source passes through the polarizer P and the compensator C and then irradates the thin film from an interface between air and the thin film. Amplitude of the incident light is represented by $E_0$, an angle between the incident light and the normal of the interface is represented by $\phi_1$, and the thickness of the thin film layer is represented by d.

A complex refractive index is defined as $\tilde{N}_i = n_i + i\kappa_i$, where $i=1, 2, 3$ respectively represent air, the thin film, and the substrate. $\tilde{N}_1$ is the complex refractive index of air, $\tilde{N}_2$ is the complex refractive index of the thin film, $\tilde{N}_3$ is the complex refractive index of the substrate, and $n_i$ and $\kappa_i$ are the real and imaginary parts of the complex refractive index respectively. The reflectance of the film for p-polarized light and s-polarized light are $r^p$ and $r^s$ respectively. $\phi_1$ is the incident angle of light, $\phi_2$ is a refraction angle of light at the interface between the air and the thin film, and $\phi_3$ is a refraction angle of light at the interface between the thin film and the substrate.

$r_{12}^p$ and $r_{12}^s$ are reflection coefficients of the p-polarized light and the s-polarized light respectively at the interface between air and the thin film, and satisfy the following equations:

$$r_{12}^p = \frac{\tilde{N}_2\cos\phi_1 - \tilde{N}_1\cos\phi_2}{\tilde{N}_2\cos\phi_1 + \tilde{N}_1\cos\phi_2}, \quad r_{12}^s = \frac{\tilde{N}_1\cos\phi_1 - \tilde{N}_2\cos\phi_2}{\tilde{N}_1\cos\phi_1 + \tilde{N}_2\cos\phi_2}.$$

$r_{23}^p$ and $r_{23}^s$ are reflection coefficients of the p-polarized light and the s-polarized light respectively at the interface between the thin film and the substrate, and satisfy the following equations:

$$r_{23}^p = \frac{\tilde{N}_3\cos\phi_2 - \tilde{N}_2\cos\phi_3}{\tilde{N}_3\cos\phi_2 + \tilde{N}\cos\phi_3}, \quad r_{23}^s = \frac{\tilde{N}_2\cos\phi_2 - \tilde{N}_3\cos\phi_3}{\tilde{N}_1\cos\phi_1 + \tilde{N}_3\cos\phi_3}.$$

The total reflection is $$r = \frac{r_{12} + r_{23}e^{2i\beta}}{1 + r_{12}r_{23}e^{2i\beta}}$$

in which $\beta = (n_2 + i\kappa_2)kd\cos\phi_2$. Ellipsometric parameters $(\Delta, \Psi)$ satisfy the following equation:

$$\frac{r^p}{r^s} = \tan\Psi e^{j\Delta}.$$

Theoretical operations of relationships between the optical constants of a material and the ellipsometric parameters are shown above.

A measurement method by the ellipsometer and a conventional fitting method are described below.

I. Specific measurement method by the ellipsometer (Here, the use of the polarizer, analyzer, compensator, etc., is only an embodiment to measure the ellipsometric parameters $(\Delta, \Psi)$. There are many other embodiments; for example, the ellipsometric parameters $(\Delta, \Psi)$ can also be obtained by a photo-elastic modulator based configuration):

(1) Acquiring an Angle $\theta_P$ of the Polarizer and an Angle $\theta_A$ of the Analyzer Respectively:

The compensator C and the analyzer A are fixed while the polarizer P is rotated, to find out the angle $\theta_P$ of the polarizer when a minimum light intensity is recorded by the detector; and the polarizer P and the compensator C are fixed while the analyzer A is rotated, to find out the angle $\theta_A$ of the analyzer when a minimum light intensity is recorded by the detector.

(2) Parameter Transforming:

The ellipsometric parameters $(\Delta, \Psi)$, the angle $\theta_P$ of the polarizer and the angle $\theta_A$ of the analyzer, and a fixed angle $\theta_C$ of the compensator satisfy a function relationship: $(\Delta, \Psi) = f(\theta_P, \theta_A, \theta_C)$. The values of the angle $\theta_P$ of the polarizer and the angle $\theta_A$ of the analyzer are directly read through the control program of the ellipsometer, and the value of the ellipsometer test parameter vector $(\Delta, \Psi)$ is obtained through the function relationship $(\Delta, \Psi) = f(\theta_P, \theta_A, \theta_C)$.

II. Data fitting is performed on the ellipsometric parameters measured by the ellipsometer, to obtain the optical constants of the sample:

(1) Modeling:

In the fitting procedure of the ellipsometry, a model of air-thin film-substrate is set up. The model of air-thin film-substrate is consistent with the configuration of the sample.

(2) Determining Basic Parameters Before the Fitting:

The materials of the thin film and the substrate are specified respectively, and an initial value of the thickness and a range of the thickness of the thin film are set. The material of the substrate can be set as a known material (such as $SiO_2$), and a refractive index file thereof can be imported directly from a material database. The refractive index of the material of the thin film is unknown, and the refractive index fitting is required, so the refractive index curve is set as a superposition of multiple optical dispersion models.

(3) Manually Setting the Profile and the Relevant Parameters Based on the Model of Air-Thin Film-Substrate and the Basic Parameters Before the Fitting:

Appropriate optical dispersion models are adopted for the material of the thin film, and the relevant parameters of each optical dispersion model is manually set, such that the results of $(\Delta, \Psi)$ obtained by fitting under the model are as close as possible to the results of the measured ellipsometric parameters $(\Delta, \Psi)$.

(4) Automatic Accurate Fitting:

The step (3) can be performed multiple times. In each time, after the step (3) is performed, a step of regression fitting can be performed. The step (4) is set because the manually set parameters in the step (3) cannot further make the results of $(\Delta, \Psi)$ obtained by the fitting approximate the measurement result. In the present step, the use of the automatic accurate fitting function of the program, can be implemented by the accurate fitting or called approximate fitting through an algorithm by the program.

The present disclosure provides a method and an apparatus for determining an optical constant of a material, and a method and an apparatus for extending a material database. The method for determining an optical constant of a material can be used in combination with a conventional ellipsometer. A novel ellipsometer may also be used to implement the method for determining an optical constant of a material in the present application.

Figure 3:
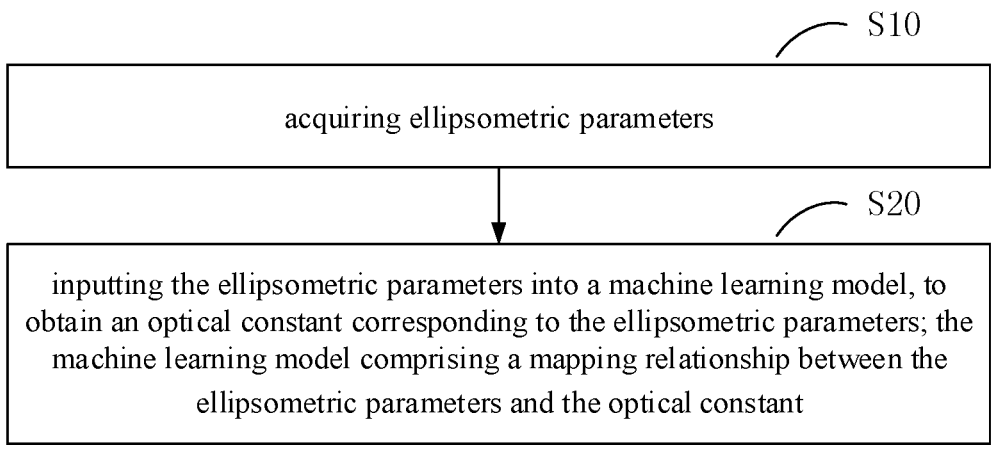
FIG. 3 is a flow chart of a method for determining an optical constant of a material according to an embodiment of the present disclosure.

Referring to FIG. 3, the present disclosure provides a method for determining an optical constant of a material, which includes the following steps.

S10: ellipsometric parameters is acquired. The ellipsometric parameters in this step can include ellipsometric parameters $\Delta$ and $\Psi$.

S20: the ellipsometric parameters are input to a machine learning model to obtain the optical constant of the material according to the ellipsometric parameters. The machine learning model includes a mapping relationship between the ellipsometric parameters and the optical constants of the material.

The optical constant of the material can include refractive index, an extinction coefficient, or a dielectric constant of the material. A specific mapping relationship between the ellipsometric parameters and the optical constant of the material can be provided based on corresponding theories of the basic physics. For example, the mapping relationship between the ellipsometric parameters and the optical constant corresponding to the ellipsometric parameters of the material can be determined according to the interference theory of single-layer film and the theories of optical reflection and transmission of the thin film.

In the present embodiment, a machine learning model is applied to a process of determining an optical constant of a material. Fast and accurate determination of optical constants of a single profile material, a multi-profile complex material, and an anisotropic material are implemented through the machine learning model. The optical constant of the material is determined through the machine learning model. The parameters of the regression fitting can be adjusted without relying too much on the experiences of the experimenters anymore, and a constant high-speed automatic correction is performed to implement the curve fitting of the measurement data, to finally obtain the optical constant of the material. For details, please refer to FIGS. 14-16, in which confirmatory tests are taken upon new materials.

Figure 14:
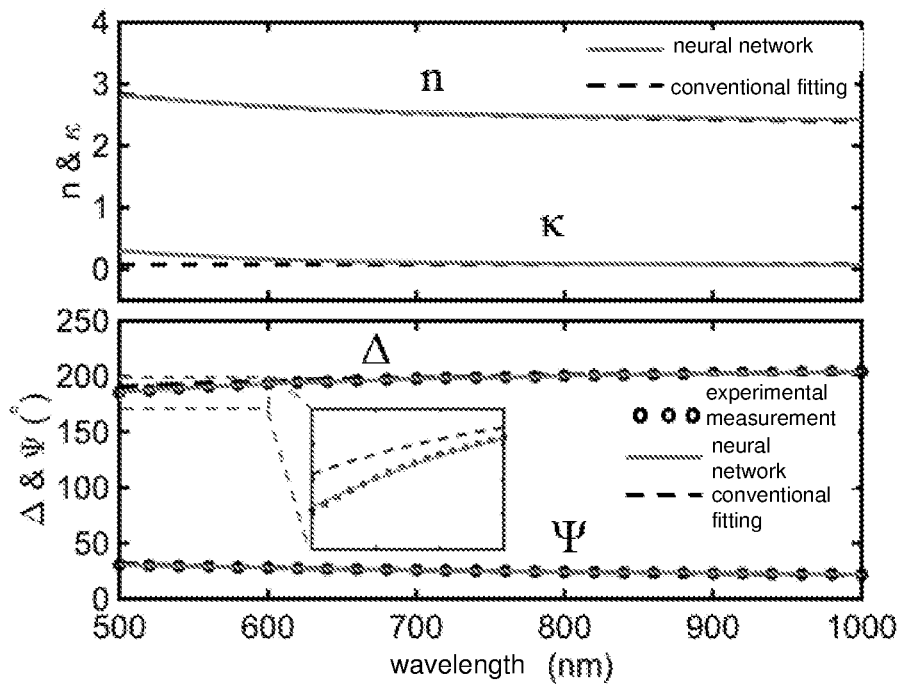
FIG. 14 is a comparison diagram between a conventional method and a method for determining an optical constant of a material according to an embodiment of the present disclosure, in which silicon is taken as a material to be tested.
Figure 15:
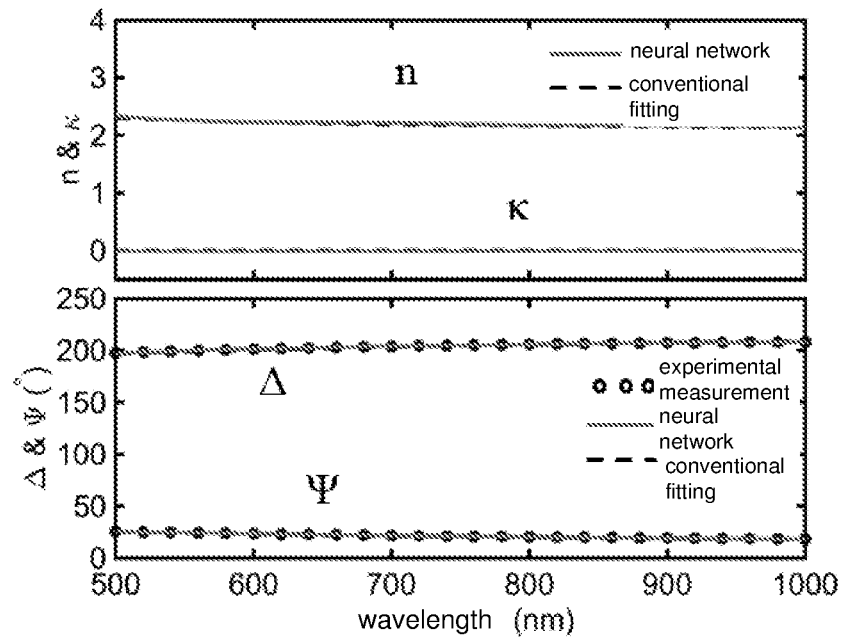
FIG. 15 is a comparison diagram between a conventional method and a method for determining an optical constant of a material according to an embodiment of the present disclosure, in which only titanium dioxide is taken as a material to be tested.
Figure 16:
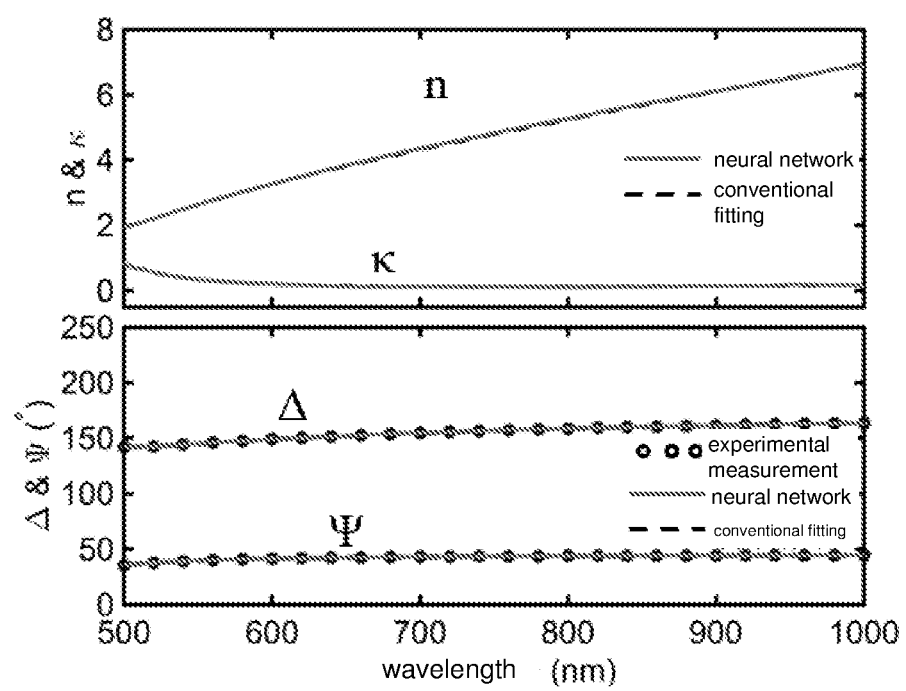
FIG. 16 is a comparison diagram between a conventional method and a method for determining an optical constant of a material according to an embodiment of the present disclosure, in which gold is taken as a material to be tested.

FIG. 14 shows a comparison diagram between the conventional fitting method and the method for determining an optical constant of a material provided by the present disclosure (called hereinafter the present method), in which the material to be tested is silicon. It can be seen from FIG. 14 that the curves of n and κ and the curves of Δ and Ψ of the semiconductor silicon obtained by the present method substantially coincides with these obtained by the conventional fitting method. In FIG. 14, near the short-wave band from 500 nm to 600 nm, the results obtained by the present method are more consistent with the measured data than these obtained by the conventional fitting method. From FIG. 14, a significant difference can be seen between the curve of κ obtained by the present method and that by the conventional fitting method in the wavelength range of 500 nm to 600 nm. In the curves of Δ and Ψ, the data of Δ of the semiconductor silicon obtained by the present method is more consistent with the actual experimental measurement value (see the sub-figure in FIG. 14). Therefore, the data obtained by the present method is more accurate than that obtained by the conventional fitting method. FIG. 15 shows a comparison diagram between the conventional fitting method and the present method, in which the material to be tested is titanium dioxide ($TiO_2$). FIG. 16 shows a comparison diagram between the conventional fitting method and the present method, in which the material to be tested is gold. The comparison results in FIGS. 14, 15 and 16 can prove that the present method can accurately calculate the refractive indices of the materials. In addition to the embodiments of silicon, titanium dioxide, and gold, the present method can also be applied to other materials to implement an automatic fitting of the ellipsometric measurement results by utilizing the machine learning model. Furthermore, the optical constants of the material obtained by the present method has the same or even higher accuracy than that obtained through the conventional fitting method.

Figure 4:
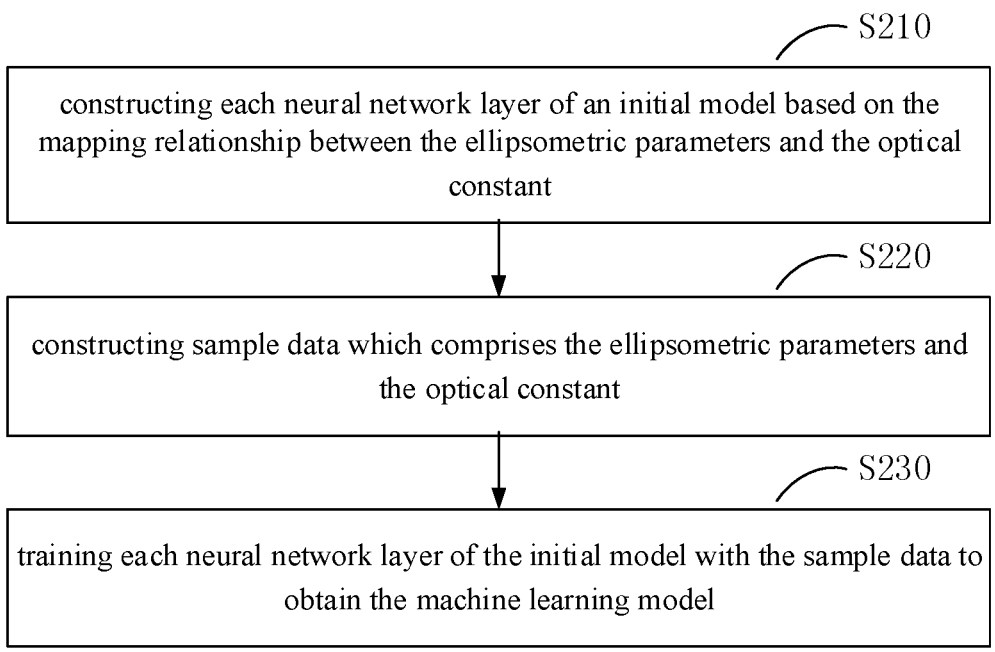
FIG. 4 is a flow chart of acquiring a machine learning model according to an embodiment of the present disclosure.

Referring to FIG. 4, in an embodiment, a modeling method for the machine learning model specifically includes the following steps.

S210: each neural network layer of an initial model is constructed based on the mapping relationship between the ellipsometric parameters and the optical constant of the material corresponding to the ellipsometric parameters. The initial model can include an input layer, an intermediate layer, and an output layer. The intermediate layer can further include one or more of a convolutional layer, a pooling layer or a fully connected layer, or any can be used as intermediate layer.

S220: sample data is constructed; the sample data can include ellipsometric parameters and the optical constant of the material.

In the present step, the ellipsometric parameters included in the sample data is a parameter input into the machine learning model. In an embodiment, the input parameter can include ellipsometric parameters Δ and ψ, an incident angle of light Φ, a wavelength λ of the light incident on the thin film, a complex refractive index of the substrate $\tilde{N}_3$, a complex refractive index of the thin film $\tilde{N}_2$, and so on. In the present step, the optical constant of the material included in the sample data is an output of the machine learning model. In an embodiment, the output can include a refractive index ($\tilde{N}$) or a dielectric constant (ε) of the thin film. For example, the output can be a vector consisting of (n, κ, d), where n and k are refractive index and extinction coefficient respectively, or a vector consisting of ($ε_r$, $ε_i$, d), where $ε_r$ and $ε_i$ are real and imaginary dielectric constants respectively. The process of constructing the sample data includes a process of data processing. For example, it is required to set the sample data corresponding to the same or similar wavelength range. The type of data included in the sample data should be comprehensive, and the quantity of data included in the sample data should be large enough. For example, the sample data includes ellipsometric parameters and optical constants of the material obtained from different optical dispersion models. The optical dispersion models includes (but not limited to) at least one of Flossie model, Gaussian model, Cauchy model, Lorentz model, Drude model, Sellmeier model, or Fano model.

S230: each neural network layer of the initial model is trained on the sample data to obtain the machine learning model. In this step, the process of training each neural network layer of the initial model can be implemented by executing computer programs.

In the present embodiment, a method for establishing a machine learning model is provided. The method specifically includes steps of constructing each neural network layer of an initial model, constructing sample data, and training each neural network layer of the initial model, to enable the initial model to carry basic functions that the machine learning model needs to implement.

Figure 5:
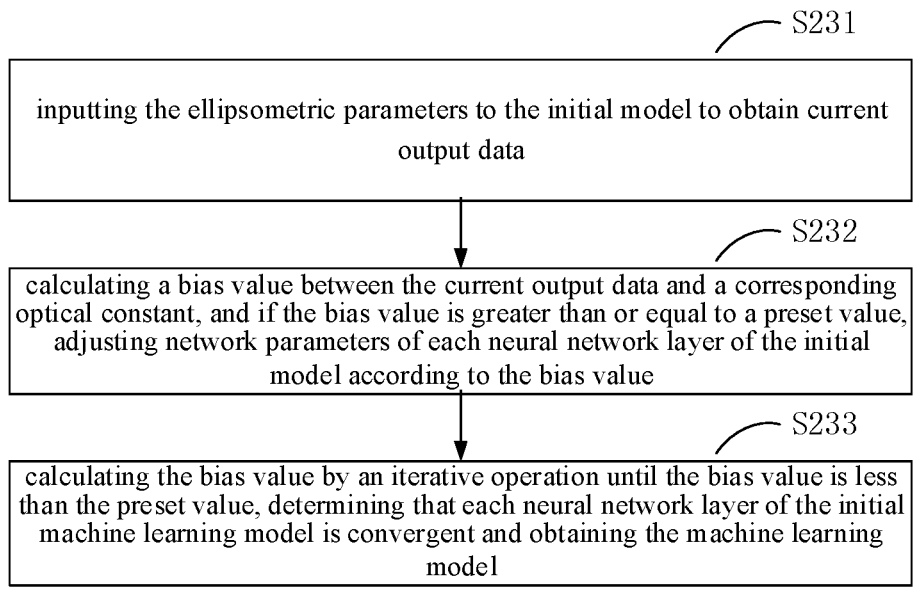
FIG. 5 is a flow chart of acquiring a machine learning model according to an embodiment of the present disclosure.

Referring to FIG. 5, in an embodiment, the step S230 of training each neural network layer of the initial model by the sample data to obtain the machine learning model may include the following steps.

S231: the ellipsometric parameters are input to the initial model to obtain a current output. In this step, the current output obtained is a data quantity in the process of training the initial model.

S232: a difference value between the current output and the corresponding optical constant of the material is calculated; if the difference value is greater than or equal to a preset value, network parameters of each neural network layer of the initial model are adjusted according to the difference value. In this step, the difference value between the current output and the optical constant of the material can reflect an extent to which the initial model is to be adjusted.

S233: the difference value is calculated by performing an iterative operation until the difference value is less than the preset value, then it is determined that each neural network layer of the initial machine learning model reaches convergence at which the machine learning model is obtained. In this step, the preset value can be a self-set value. For example, the preset value can be $10^{-6}$ or $10^{-8}$.

In the present embodiment, each neural network layer of the initial model is trained by the sample data to obtain the machine learning model. It should be appreciated that multiple different types of the machine learning models can be established according to the requirements of test accuracy. Multiple types of machine learning models can be trained on the same sample data, or each type of the machine learning model can be trained on different sample data. In this way, the trained machine learning model has a higher accuracy, and can satisfy the use of different types of data. In the present embodiment, the method provided can be applied to obtain one or more types of machine learning models according to the initial model, and the specific model can be selected according to the actual requirement.

Figure 6:
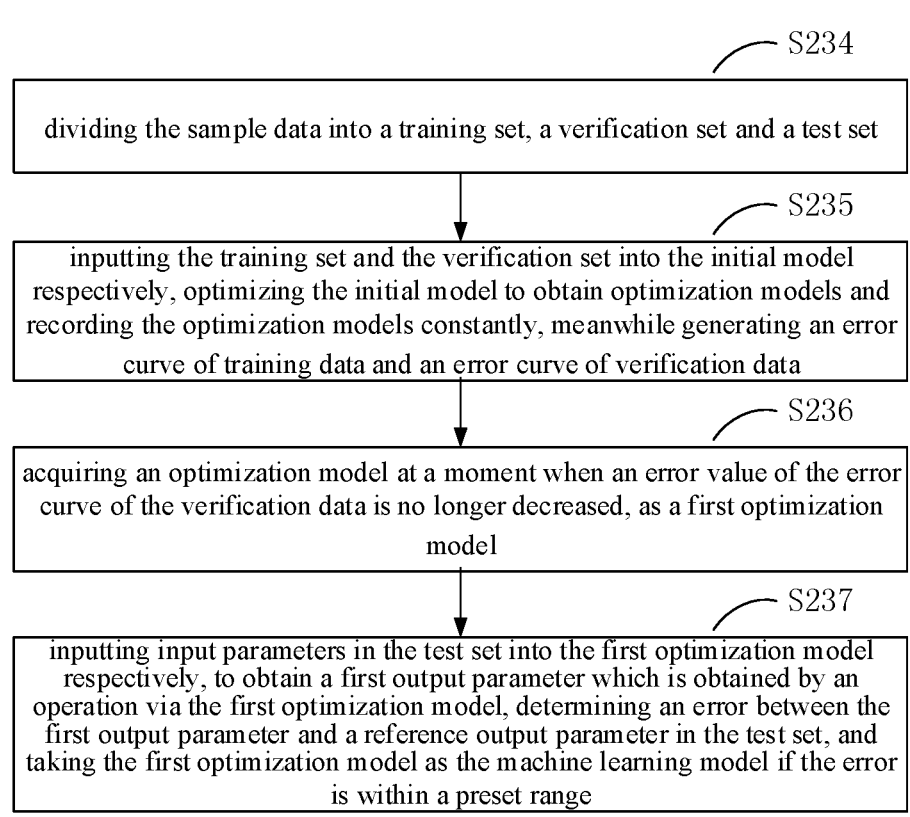
FIG. 6 is a flow chart of acquiring a machine learning model according to an embodiment of the present disclosure.

Referring to FIG. 6, in an embodiment, the step S230 of training each neural network layer of the initial model on the sample data to obtain the machine learning model can include the following steps.

S234: the sample data is divided into a training set, a validation set and a test set. In this step, the training set, the validation set and the test set are three data sets that do not overlap each other. For example, 10000 entries are provided, a training set includes 6000 entries, a validation set includes 2000 entries, and a test set includes 2000 entries; each entry includes ellipsometric parameters $\Delta$ and $\Psi$, a thickness d of the thin film, a wavelength $\lambda$, an incident angle, the refractive index n and the extinction coefficient k. The data sets in the sample data described herein can also be allocated according to other proportions. The training set and the validation set are put into the initial model simultaneously, which can implement the effect of verification while training.

S235: the training set and the validation set are respectively input into the initial model to optimize the initial model, and optimization models are obtained and recorded constantly. Meanwhile an error curve of the training set and an error curve of the validation set are generated. In this step, the optimization models can be recorded constantly by a computer, and meanwhile an error curve can be generated by the computer.

Figure 13:
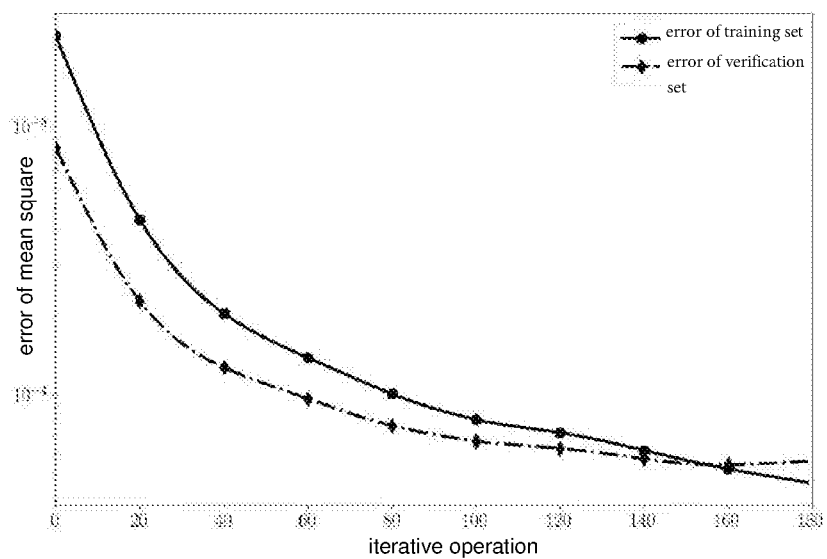
FIG. 13 is a data diagram of an error test in a process of acquiring a machine learning model according to an embodiment of the present disclosure.

Referring to FIG. 13, for a point on the error curve of the training set, the abscissa of the point represents the time or number of iterative operations for obtaining the point, and the ordinate of the point represents an error between an operation result obtained from the initial model under the corresponding abscissa and the actual optical constant of the material. For a point on the error curve of the validation set, the abscissa of the point represents the time or number of iterative operations for obtaining the point, and the ordinate of the point represents an error between an operation result obtained from the initial model under the corresponding abscissa and the actual optical constant of the material.

S236: an optimization model in S235 at a moment when an error value of the error curve of the validation set no longer decreases is taken as a first optimization model. In this step, there may be multiple specific methods for acquiring the first optimization model, such as a marker search method.

S237: input parameters in the test set are input into the first optimization model to obtain a first output parameter which is obtained by calculation via the first optimization model; an error between the first output parameter and a reference output parameter in the test set is determined; if the error is within a preset range, the first optimization model is determined as the machine learning model.

In the present embodiment, it should be noted that the machine learning system is trained by the training set and the performance of the machine learning system is monitored by the validation set. The training is stopped when the performance of the machine learning system on the validation set no longer improves. The machine learning model with the best performance on the validation set is selected as a training model. After repeating this process several times, a model with the best performance on the validation set is selected as a final machine learning system and the performance thereof is tested by the test set.

Figure 7:
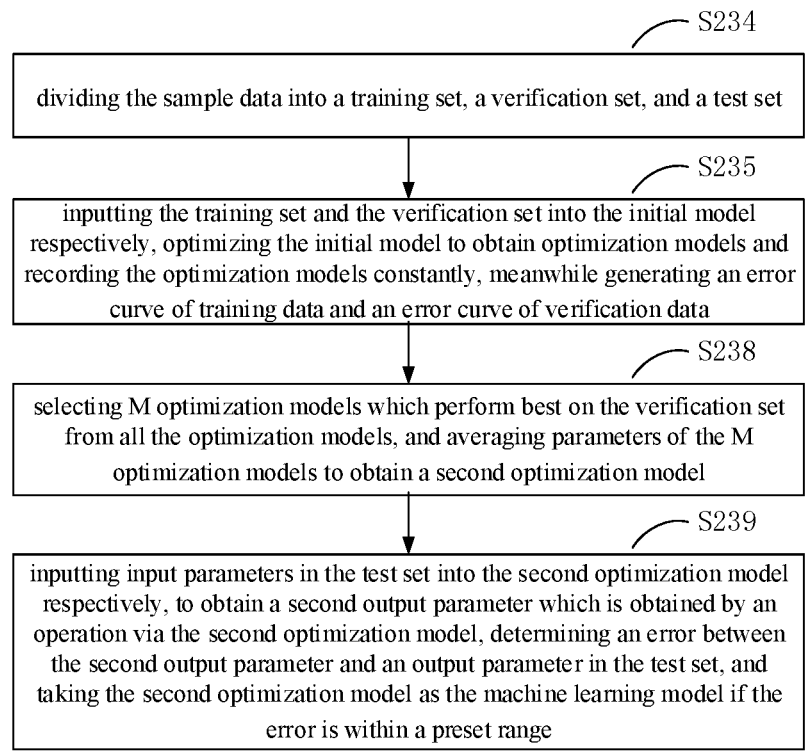
FIG. 7 is a flow chart of acquiring a machine learning model according to an embodiment of the present disclosure.

Referring to FIG. 7, in an embodiment, the step S230 of training each neural network layer of the initial model on the sample data to obtain the machine learning model may include the following steps.

S234: the sample data is divided into a training set, a validation set and a test set.

S235: the training set and the validation set are respectively input into the initial model, the initial model is optimized and optimization models are obtained and recorded constantly, meanwhile an error curve of the training set and an error curve of the validation set are generated.

S238: M optimization models performing best obtained by the validation set are selected from all optimization models, and parameters of the M optimization models are averaged to obtain a second optimization model.

In the present step, M is an integral number greater than 1. The M optimization models with the best performance or the first M optimization models with the best performance are selected from the models formed on the training set; multiple types of parameters in the M optimization models are acquired, and the parameters of each type in the multiple types of parameters are averaged to obtain multiple types of average parameters. The multiple types of average parameters are taken as multiple parameters of the second optimization model.

S239: the input parameter in the test set are respectively input into the second optimization model, to obtain a second output parameter which is obtained by calculation via the second optimization model. An error between the second output parameter and the reference output parameter in the test set is determined. If the error is within a preset range, the second optimization model is determined as the machine learning model.

Figure 8:
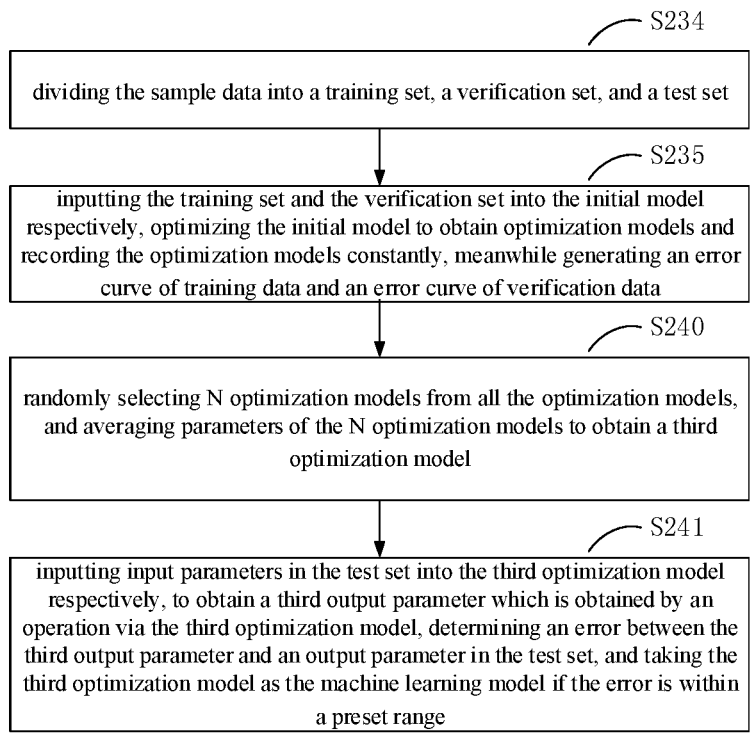
FIG. 8 is a flow chart of acquiring a machine learning model according to an embodiment of the present disclosure.

Referring to FIG. 8, in an embodiment, the step S230 of training each neural network layer of the initial model on the sample data to obtain the machine learning model can include the following steps.

S234: the sample data is divided into a training set, a validation set and a test set.

S235: the training set and the validation set are respectively input into the initial model, the initial model is optimized and optimization models are obtained and recorded constantly, meanwhile an error curve of the training set and an error curve of the validation set are generated.

S240: N optimization models are randomly selected from all optimization models, and the parameters of the N optimization models are averaged to obtain a third optimization model. In this step, N is an integral number greater than 1. This step can be implemented by employing a machine learning model ensemble technology. For example, other specific methods can include: N optimization models are stored, and the input parameters of the sample data are input into the N optimization models respectively to obtain N output parameters, and an average value of the N output parameters is taken as an output parameter of an ensemble model.

S241: the input parameters in the test set are input into the third optimization model respectively, to obtain a third output parameter which is obtained by calculation via the third optimization model; an error between the third output parameter and the reference output parameter in the test set is determined, if the error is within a preset range, the third optimization model is determined as the machine learning model.

In an embodiment, the sample data in the training set, the validation set and the test set are homogeneous data. In the present embodiment, it is also possible to express that the sample data in the training set, the validation set and the test set cover data obtained by fitting via the ellipsometer under all profiles. The sample data in the training set, the validation set and the test set cover any one or more of ellipsometric parameters $\Delta$ and $\Psi$, a thickness d of the thin film, a wavelength $\lambda$, an incident angle, a real part of the refractive index $n_3$, and an imaginary part of the refractive index $\kappa_3$ obtained by all methods.

In an embodiment, the preset range of the error is from $10^{-5}$ to $10^{-9}$. Furthermore, the preset range of the error is from $10^{-5}$ to $10^{-7}$, such as, the error is $10^{-6}$.

In an embodiment, the method for determining an optical constant of a material further includes the following step.

The sample data is adjusted to make the input parameters corresponding to different wavelength ranges to correspond to the same wavelength range. The adjustment in the present step is to adjust the ellipsometric parameters of the same type into a form that is suitable for training the machine learning model. In an embodiment, the angle value of the incident angle is transformed into a radian value.

The input parameters in the sample data are normalized to make values of different types of the input parameters in the same order of magnitude. For example, the input parameters in the same type can be uniformly divided by 1000.

In the present embodiment, by adjusting and normalizing the input data, the training process of each neural network layer of the machine learning model is more stable, and is easy to implement, and the training results of the machine learning model are more accurate.

Figure 9:
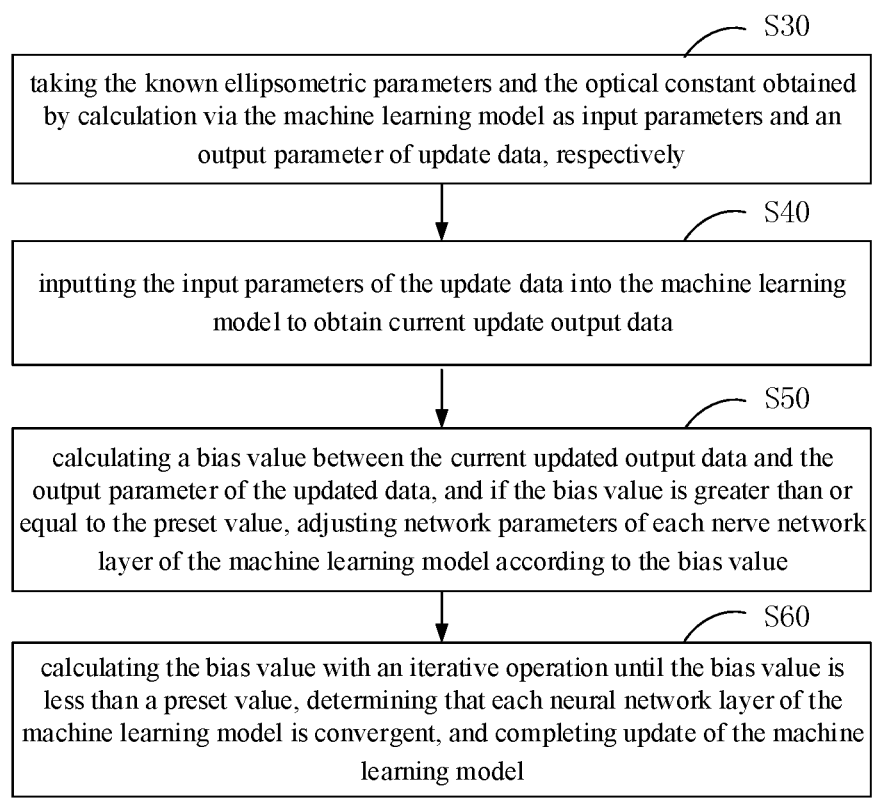
FIG. 9 is a flow chart of a method for determining an optical constant of a material and updating a machine learning model according to an embodiment of the present disclosure.

Referring to FIG. 9, in an embodiment, the method for determining an optical constant of a material can further include a step of updating the machine learning model.

S30: the ellipsometric parameters are taken as input parameters of update data and the optical constant of the material obtained by operation via the machine learning model is taken as an output parameter of the update data, respectively.

In the present step, the machine learning model has been formed, and the ellipsometric parameters and the optical constant of the material obtained through the operation are input into the machine learning model, to further train and update the machine learning model.

S40: the input parameters of the updated data are input to the machine learning model to obtain currently updated output data. In this step, the currently updated output data obtained is an auqantity in the process of training the initial model.

S50: a difference value between the currently updated output data and an output parameter of the updated data is calculated; if the difference value is greater than or equal to a preset value, the network parameters of each neural network layer of the machine learning model are adjusted according to the difference value. In this step, the difference value between the currently updated output data and the output parameter of the updated data can partly reflect the degree to which the machine learning model is to be adjusted.

S60: the difference value is calculated by an iterative operation until the difference value is less than a preset value, then it is determined that each neural network layer of the machine learning model reaches convergence at which the update of the machine learning model is completed. In this step, the preset value can be a self-set value. For example, the preset value can be $10^{-6}$ or $10^{-8}$.

In the present embodiment, the ellipsometric parameters and the optical constant of the material corresponding to the ellipsometric parameters obtained by an operation via the machine learning model are taken as input parameters and an output parameter of the update data respectively, to update the machine learning model. In the present embodiment, the provided method can implement the self-learning function of the machine learning. The specific time interval for update of the machine learning model can be set according to the actual requirement.

In an embodiment, the machine learning model includes one or more of a convolutional neural network, a fully connected neural network, and a recurrent neural network. The machine learning model can include any kind of the neural networks, or a combination of any multiple kinds of neural networks. When constructing the machine learning model, which neural network is employed can be determined according to the actual requirement.

Figure 10:
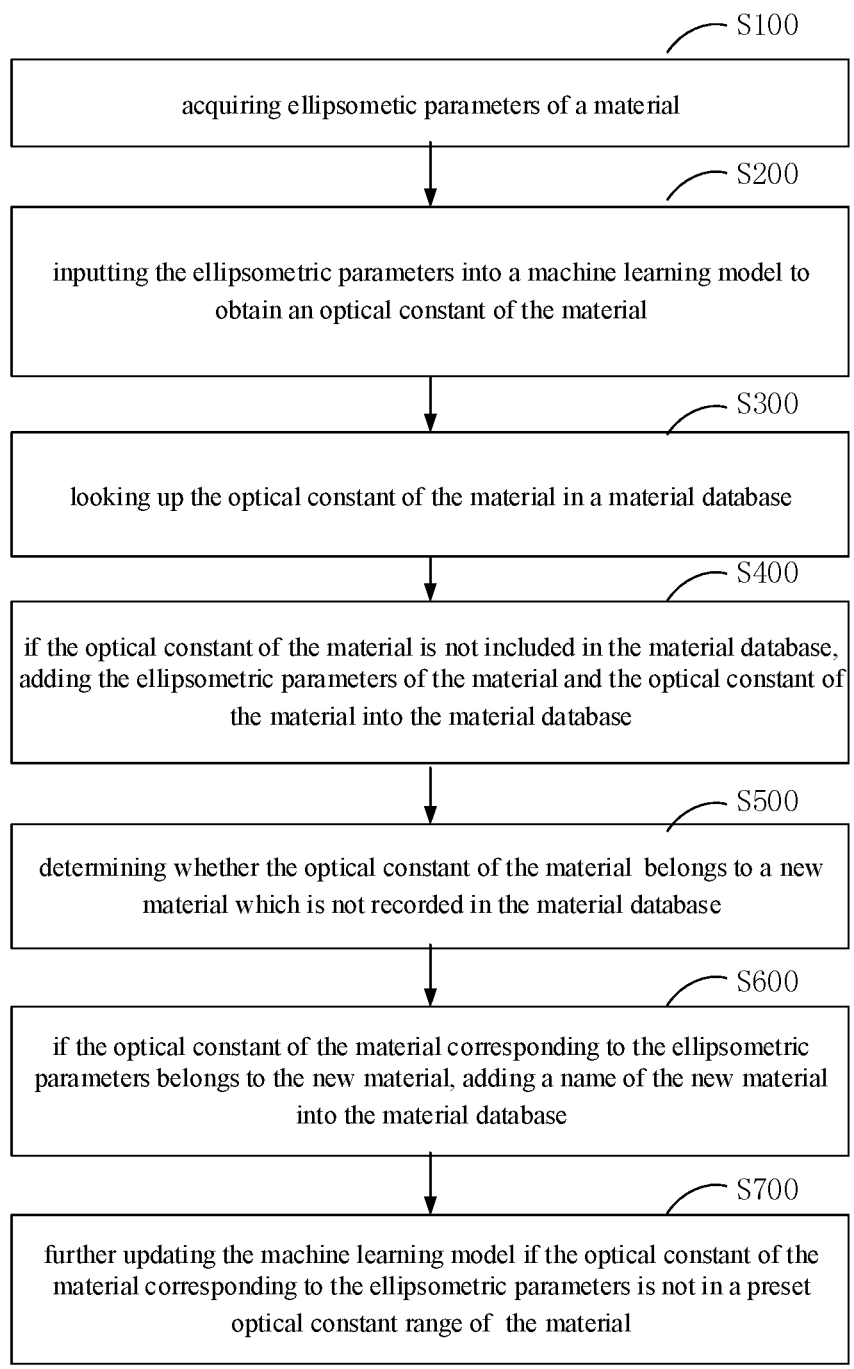
FIG. 10 is a flow chart of a method for extending a material database according to an embodiment of the present disclosure.

Referring to FIG. 10, the present disclosure further provides a method for extending a material database, including the following steps.

S100: ellipsometric parameters of a material are acquired. The ellipsometric parameters described in this step can include ellipsometric parameters $\Delta$ and $\Psi$.

S200: the ellipsometric parameters are input to a machine learning model to obtain an optical constant of a material corresponding to the ellipsometric parameters. In this step, the optical constant of the material can include a refractive index or a dielectric constant of the material. The specific mapping relationship between the ellipsometric parameters and the optical constant can be provided based on corresponding theories of the basic physics. For example, the mapping relationship between the ellipsometric parameters and the optical constant of the material can be determined according to the interference theory of a single-layer film, the optical reflection/transmission theory of the material film.

S300: the optical constant of the material is looked up in a material database. The material database described in this step can include ellipsometric parameters of a material, an optical constant (including a refractive index/dielectric constant) of a material, and a name of a material.

S400: if the optical constant of the material is not included in the material database, the ellipsometric parameters of the material and the optical constant of the material corresponding to the ellipsometric parameters are added into the material database. In this step, the method can further include, after the detection and identification of the optical constant of the material by a scientific researcher or other authoritative tools, the ellipsometric parameters of the material and the optical constant of the material corresponding to the ellipsometric parameters are added into the material database.

The present embodiment provides a method for extending a material database. In the method, ellipsometric parameters of a material are input into a machine learning model. An operation is performed to obtain an optical constant of the material corresponding to the ellipsometric parameters. The optical constant of the material is looked up in a material database. If the optical constant of the material is not included in the material database, the optical constant of the material is added into the material database. The method for extending a material database can accurately add the relevant data of the material into a material database.

In an embodiment, the method for extending a material database can further include the following steps.

S500: it is determined whether the optical constant of the material corresponding to the ellipsometric parameters belongs to a new material which is not recorded in the material database. In an embodiment, whether the optical constant of the material corresponding to the ellipsometric parameters belongs to a new material can be determined by reasonable inferences of the scientific researchers, or by measuring via a measuring instrument, or by monitoring whether the results obtained by multiple training are consistent with the results obtained by multiple measurements in the system.

S600: if the optical constant of the material corresponding to the ellipsometric parameters belongs to a new material which is not recorded in the material database, the name of the new material is added into the material database. In an embodiment, if the material is a new material, a step of material classification is performed, and the new material is added into the material database.

In an embodiment, the method for extending a material database can further include:

S700: if the optical constant of the material corresponding to the ellipsometric parameters is not in a preset optical constant range of the material, the machine learning model is further updated.

In the present embodiment, if the optical constant of the material corresponding to the ellipsometric parameters is not in a preset optical constant range of the material, it is necessary to determine whether there is an error in the operation result of the optical constant of the material corresponding to the ellipsometric parameters. If there is an error in the operation result, the machine learning model needs to be updated. The specific steps of updating the machine learning model can be performed according to S30-S60. If there is no error, the relevant data of the material is added into the material database.

It should be understood that although the steps in the flow charts of FIGS. 3-10 are sequentially shown according to the directions of the arrows, these steps are not definitely performed sequentially in the order indicated by the arrows. Unless explicitly stated in this disclosure, the execution order of these steps is not strictly limited, and these steps can be performed in other orders. Moreover, at least a part of the steps in FIGS. 3-10 can include multiple sub-steps or stages. These sub-steps or stages are not definitely performed at the same time, but can be performed at different time. The execution order of these sub-steps or stages is not definitely performed sequentially, but can be performed in turn or alternately with at least a part of another step or a sub-step or stage of another step.

Figure 11:
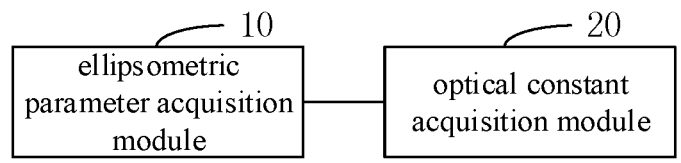
FIG. 11 is a schematic view of an apparatus for determining an optical constant of a material according to an embodiment of the present disclosure.

Referring to FIG. 11, the present disclosure provides a material optical constant determination apparatus 100 including: ellipsometric parameters acquisition module 10 and a material optical constant acquisition module 20.

The ellipsometric parameters acquisition module 10 is configured to acquire the ellipsometric parameters of a material. The material optical constant acquisition module 20 is configured to input the ellipsometric parameters into the machine learning model to obtain an optical constant of the material corresponding to the ellipsometric parameters. The machine learning model includes an experimental condition of the ellipsometric measurement and a mapping relationship between the acquired ellipsometric parameters and the obtained optical constant of the material.

The apparatus 100 for determining an optical constant of a material provided in the present embodiment can apply a machine learning model to a process of determining an optical constant of a material. The apparatus 100 for determining an optical constant of a material implements a fast and accurate determination of the optical constant of materials which are described by a single optical dispersion-model, multi-optical dispersion-model, or in anisotropic nature. The optical constant is determined through apparatus 100 for determining the optical constant of the material. Accordingly, the parameters in the regression fitting are adjusted without relying on the experience of the experimenter anymore; and the apparatus 100 for determining an optical constant of a material continuously attempts to implement the fitting of the measurement data to the model curve, and finally obtains the optical constant of the material.

Figure 12:
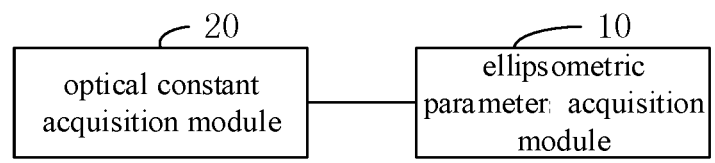
FIG. 12 is a schematic view of an apparatus for extending a material database according to an embodiment of the present disclosure.
Figure 12:
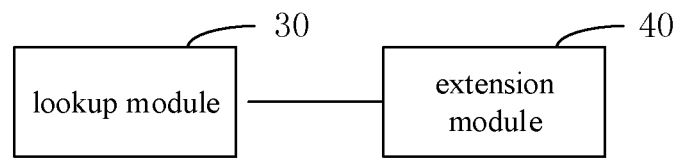

Referring to FIG. 12, the present disclosure provides an apparatus 200 for extending a material database including: an ellipsometric parameter acquisition module 10, a material optical constant acquisition module 20, a lookup module 30 and an extension module 40.

The ellipsometric parameter acquisition module 10 is configured to acquire ellipsometric parameters of the material.

The material optical constant determination module 20 is configured to input the ellipsometric parameters into a machine learning model to obtain an optical constant of the material corresponding to the ellipsometric parameters. In an embodiment, the material optical constant acquisition module 20 can include the machine learning model.

The lookup module 30 is configured to look up an optical constant of a material in a material database.

If the optical constant of the material is not included in the material database, the extension module 40 is configured to add the ellipsometric parameters of the material and the optical constant of the material corresponding to the ellipsometric parameters into the material database.

In the present embodiment, the apparatus 200 for extending a material database can accurately add the relevant data of a new material which is not recorded in the material database into the material database. Specifically, the ellipsometric parameter acquisition module 10 acquires the ellipsometric parameters of the material. The ellipsometric parameters of the material are input into the machine learning model by the material optical constant acquisition module 20, to perform an operation and obtain an optical constant of the material corresponding to the ellipsometric parameters. The lookup module 30 is configured to look up the optical constant of the material in the material database through a comparison between the optical constants obtained through the operation and the optical constant in the material database. If the optical constant of the material is not included in the material database, the optical constant of the material is added to the material database through the expansion module 40.

Figure 17:
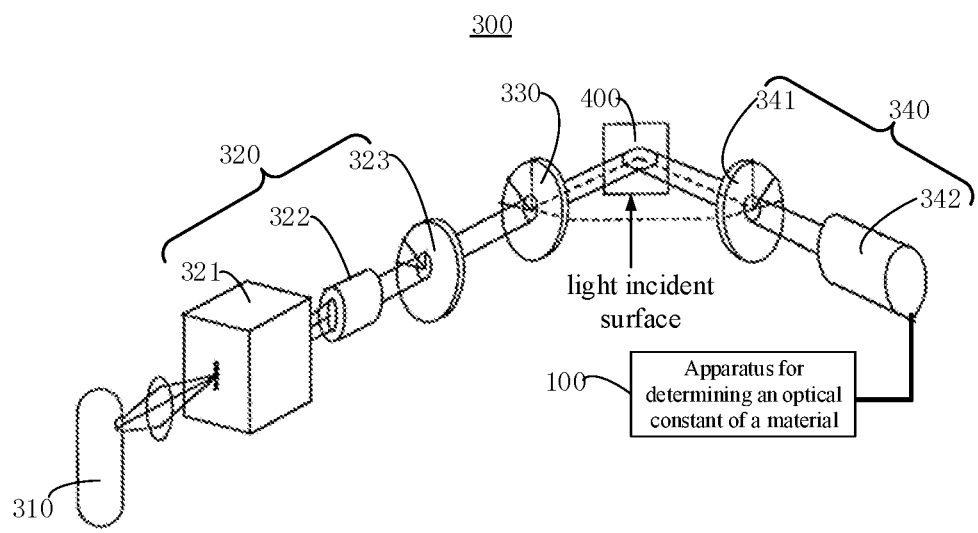
FIG. 17 is a schematic structure diagram of an ellipsometer according to an embodiment of the present disclosure.

Referring to FIG. 17, which is a schematic structure view illustrating an ellipsometer 300 provided by an embodiment of the present invention. The ellipsometer 300 includes a light source 310, a light selection device 320, a light polarization compensation device 330, a light polarization analysis device 340 and a material optical constant determination device 100.

The light source 310 is configured to emit light. The light source 310 can emit light in any wavelength band according to an experimental requirement.

The light selection device 320 is configured to select and adjust the wavelength and polarization of the light. As shown in FIG. 17, the light selection device 320 can further include a monochromator 321, a collimator 322, and a polarizer 323 which are arranged in the same optical path. The monochromator 321 separates a series of narrow-band electromagnetic radiation from a wide-band radiation beam. The monochromator 321 can be a prism or a grating. The collimator 322 converts the light passing through the monochromator 321 into collimated light, and the collimator 322 allows the collimated light to enter the polarizer 323 and subsequent optical elements with the maximum efficiency. The polarizer 323 is an optical element or instrument polarizing the light along a specific direction.

The light polarization compensation device 330 modifies the polarization state of the light to form a probe light, and the probe light irradiates a surface of the sample material 400. The material sample 400 includes a substrate 410 and a thin film 420 on a surface of the substrate 410. In an embodiment, the light polarization compensation device 330 is a compensator or waveplate.

The light polarization analysis device 340 is configured to obtain the probe light reflected or refracted by the sample material 400, and obtain a measurement result measurement result. Specifically, the light polarization analysis device 340 as shown in FIG. 17 can include a light polarization detector 341 and a light intensity detector 342. The measurement result includes ellipsometric parameters ($\Delta$, $\Psi$) of the sample material 400.

The device 100 for determining an optical constant of a material is configured to determine a optical constant of the thin film 420 according to the ellipsometric parameters ($\Delta$, $\Psi$), a wavelength of the probe light, an incident angle of the probe light, a real part and an imaginary part of the refractive index of the substrate 410 by the method for determining an optical constant of a material described in any one of the above-mentioned embodiments. The optical constant includes at least one of a refractive index, a dielectric coefficient of the thin film 420 and the like.

In an embodiment, the ellipsometer 300 can cover a wide spectral range from 100 nm to 2200 nm. The ellipsometer 300 can automatically select parts and self select accessories to enhance the functions of the system and meet the requirements of the experiments. The ellipsometer 300 is combined with the material optical constant determination device 100, which can implement a high-precision and high-sensitivity detection.

The ellipsometer 300 can be applied in the fields of biological/life science research, chemistry/polymer research, plate technology, food/beverage, metallurgy technology, nanotechnology, pigment/powder/coating, medicine/cosmetics, solar photovoltaic, process control, silicon, surface analysis, carbon material or other materials.

In the field of semiconductors, the ellipsometer can be employed to characterize optically an organic semiconductor, characterize III-V semiconductors, and characterize a property of a ferroelectric thin film.

In the field of metallurgical technology, the ellipsometer can be employed to characterize surface properties of anodized metals.

In the field of solar photovoltaics, the ellipsometer can be employed to characterize the thin-film quality and performance of photovoltaic devices.

In another material field, for example, the ellipsometer can be employed to characterize the material properties of chalcogenide glass.

In an embodiment, a computer device is provided, which includes a processor and a memory storing a computer program executable on the processor. The processor executes the computer program to implement the following steps of:

acquiring ellipsometric parameters;

inputting the ellipsometric parameters into a machine learning model to obtain a material optical constant corresponding to the ellipsometric parameters; the machine learning model including a mapping relationship between the ellipsometric parameters and the material optical constant.

In an embodiment, the processor executes the computer program to further implement the following steps of:

acquiring the ellipsometric parameters of a material;

inputting the ellipsometric parameters into the machine learning model to obtain an optical constant of the material corresponding to the ellipsometric parameters;

looking up the optical constant of the material in a material database;

if the optical constant of the material is not included in the material database, adding the ellipsometric parameters of the material and the optical constant of the material corresponding to the ellipsometric parameters into the material database.

In an embodiment, a computer-readable storage medium is provided, on which a computer program is stored. The computer program is executed by a processor to implement the following steps of:

acquiring ellipsometric parameters;

inputting the ellipsometric parameters into a machine learning model to obtain an optical constant corresponding to the ellipsometric parameters; the machine learning model including a mapping relationship between the ellipsometric parameters and the optical constant.

In an embodiment, the computer program is executed by the processor to further implement the following steps of:

acquiring the ellipsometric parameters of the material;

inputting the ellipsometric parameters into the machine learning model to obtain an optical constant of the material corresponding to the ellipsometric parameters;

looking up the optical constant of the material in a material database;

if the optical constant of the material is not included in the material database, adding the ellipsometric parameters of the material and the optical constant of the material corresponding to the ellipsometric parameters into the material database.

Those skilled in the art can understand that all or part of the processes in the methods described in the foregoing embodiments can be implemented by a computer program to instruct a related hardware. The computer program can be stored in a non-transitory computer-readable storage medium. The computer program, when executed, can include the processes of the method embodiments described above. Any reference to the memory, storage, database or other media used in the embodiments provided in the present invention can include non-transitory and/or transitory memory. The non-transitory memory can include read-only memory (ROM), programmable ROM (PROM), electrically programmable ROM (EPROM), electrically erasable programmable ROM (EEPROM), or flash memory. The transitory memory can include random access memory (RAM) or external cache memory. By way of illustration and not limitation, RAM is available in many forms, such as static RAM (SRAM), dynamic RAM (DRAM), synchronous DRAM (SDRAM), dual data rate SDRAM (DDRSDRAM), enhanced SDRAM (ESDRAM), synchronous chain Synchlink DRAM (SLDRAM), memory bus (Rambus) direct RAM (RDRAM), direct memory bus dynamic RAM (DRDRAM), and memory bus dynamic RAM (RDRAM).

The technical features of the embodiments described above can be arbitrarily combined. In order to simplify the description, not all possible combinations of the technical features in the above embodiments are described. However, as long as there is no contradiction in the combination of these technical features, the combination should be considered as the scope of the present disclosure.

The above-mentioned embodiments are merely several exemplary embodiments of the present invention, and their descriptions are more specific and detailed, but they cannot be understood as limiting the scope of the present disclosure. It should be noted that, those skilled in the art can make several modifications and improvements without departing from the concept of the present disclosure, which all belong to the scope of protection of the present disclosure. Therefore, the scope of protection of the present disclosure shall be subject to the appended claims.

What is claimed is:

1. A method for determining an optical constant of a material, comprising:
    acquiring ellipsometric parameters of the material; and
    inputting the ellipsometric parameters into a machine learning model to obtain the optical constant of the material corresponding to the ellipsometric parameters; the machine learning model comprising a mapping relationship between the ellipsometric parameters and the optical constant of the material;
    wherein the machine learning model is established by:
    constructing each neural network layer of an initial model based on the mapping relationship between ellipsometric parameters and the optical constant of the material corresponding to the ellipsometric parameters;
    constructing sample data which comprises the ellipsometric parameters and the optical constant of the material; and
    training the each neural network layer of the initial model with the sample data to obtain the machine learning model;
    wherein the training the each neural network layer of the initial model with the sample data to obtain the machine learning model comprises:
    dividing the sample data into a training set, a validation set, and a test set;
    inputting the training set and the validation set into the initial model respectively, optimizing the initial model to obtain optimization models and recording the optimization models constantly, meanwhile generating an error curve of the training set and an error curve of the validation set;
    selecting M optimization models which perform best on the validation set from all optimization models, and averaging parameters of the M optimization models to obtain a second optimization model; and
    inputting input parameters in the test set into the second optimization model to obtain a second output parameter which is obtained by an operation via the second optimization model, determining an error between the second output parameter and a reference output parameter in the test set, and taking the second optimization model as the machine learning model when the error is within a preset range;
    or
    wherein the training the each neural network layer of the initial model with the sample data to obtain the machine learning model comprises:
    dividing the sample data into a training set, a validation set, and a test set;
    inputting the training set and the validation set into the initial model respectively, optimizing the initial model to obtain optimization models and recording the optimization models constantly, meanwhile generating an error curve of the training set and an error curve of the validation set;
    randomly selecting N optimization models from all optimization models, and averaging parameters of the N optimization models to obtain a third optimization model; and
    inputting input parameters in the test set into the third optimization model to obtain a third output parameter which is obtained by an operation via the third optimization model, determining an error between the third output parameter and a reference output parameter in the test set, and taking the third optimization model as the machine learning model when the error is within a preset range.

2. The method according to claim 1, wherein the training the each neural network layer of the initial model with the sample data to obtain the machine learning model comprises:
    inputting the ellipsometric parameters to the initial model to obtain current output data;
    calculating a difference value between the current output data and a corresponding optical constant of the material, and when the difference value is greater than or equal to a preset value, adjusting network parameters of the each neural network layer of the initial model according to the difference value; and
    calculating the difference value by an iterative operation until the difference value is less than the preset value, determining that each neural network layer of the initial machine learning model reaches convergence and obtaining the machine learning model.

3. The method according to claim 1, wherein the training the each neural network layer of the initial model with the sample data to obtain the machine learning model comprises:
    dividing the sample data into a training set, a validation set and a test set;
    inputting the training set and the validation set into the initial model respectively, optimizing the initial model to obtain optimization models and recording the optimization models constantly, while generating an error curve of the training set and an error curve of the validation set;
    taking an optimization model as a first optimization model at a moment when an error value of the error curve of the verification data no longer decreases; and
    inputting input parameters in the test set into the first optimization model to obtain a first output parameter obtained by an operation via the first optimization model, determining an error between the first output parameter and a reference output parameter in the test set, and taking the first optimization model as the machine learning model when the error is within a preset range.

4. The method according to claim 3, wherein the sample data of the training set, the validation set and the test set is homogeneous data.

5. The method according to claim 1, further comprising:
adjusting the sample data such that input parameters corresponding to different wavelength ranges correspond to a same wavelength range; and
normalizing the input parameters in the sample data such that values of the input parameters corresponding to the different wavelength ranges are in a same order of magnitude.

6. The method according to claim 1, further comprising:
taking the ellipsometric parameters as input parameters of updated data and the optical constant of the material obtained by operation via the machine learning model as an output parameter of the updated data, respectively;
inputting the input parameters of the updated data into the machine learning model to obtain current update output data;
calculating a difference value between the current updated output data and the output parameter of the updated data, and when the difference value is greater than or equal to the preset value, adjusting network parameters of the each nerve network layer of the machine learning model according to the difference value; and
calculating the difference value with an iterative operation until the difference value is less than a preset value, determining that each neural network layer of the machine learning model reaches convergence thereby completing update of the machine learning model.

7. The method according to claim 6, wherein the ellipsometric parameters comprise $\Delta$ and $\Psi$, and the ellipsometric parameters ($\Delta$, $\Psi$) satisfy the following equation:

$$\frac{r^P}{r^s} = \tan\Psi e^{j\Delta}.$$

wherein $r^P$ and $r^s$ respectively represent reflectance of the film for p-polarized light and s-polarized light.

8. The method according to claim 1, wherein the machine learning model comprises one or more of a convolutional neural network, a fully-connected neural network, or a recurrent neural network.

* * * * *